(12) United States Patent
Drouvot et al.

(10) Patent No.: US 10,393,369 B2
(45) Date of Patent: Aug. 27, 2019

(54) SYSTEM AND METHOD FOR FLUID MEDIUM PREHEATING

(71) Applicant: General Electric Technology GmbH, Baden (CH)

(72) Inventors: Paul Drouvot, Village-Neuf (CH); Torbjorn Stenstrom, Baden (CH); Klara Berg, Brugg (CH)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/307,700

(22) PCT Filed: Mar. 27, 2015

(86) PCT No.: PCT/EP2015/056715
§ 371 (c)(1),
(2) Date: Oct. 28, 2016

(87) PCT Pub. No.: WO2015/165668
PCT Pub. Date: Nov. 5, 2015

(65) Prior Publication Data
US 2017/0074504 A1    Mar. 16, 2017

(30) Foreign Application Priority Data

Apr. 28, 2014 (EP) .................... 14166156
Dec. 19, 2014 (EP) .................... 14199167

(51) Int. Cl.
*F22D 1/32* (2006.01)
*F22B 37/02* (2006.01)
(Continued)

(52) U.S. Cl.
CPC ............ *F22D 1/325* (2013.01); *F22B 37/025* (2013.01); *F22D 1/003* (2013.01); *F22D 1/12* (2013.01); *Y02E 20/16* (2013.01)

(58) Field of Classification Search
CPC ...................................................... F22D 1/325
See application file for complete search history.

(56) References Cited

U.S. PATENT DOCUMENTS 3,719,172 A    3/1973  Charcharos et al.
3,910,236 A    10/1975 Merritt
(Continued)

FOREIGN PATENT DOCUMENTS

DE    19512466 C1    8/1996
DE    19736889 C1    2/1999
(Continued)

OTHER PUBLICATIONS

European Search Report and Opinion issued in connection with corresponding EP Application No. 14166156.1 dated Oct. 10, 2014.
(Continued)

*Primary Examiner* — Nathaniel Herzfeld
(74) *Attorney, Agent, or Firm* — Charlotte C. Wilson; Frank A. Langraff

(57) ABSTRACT

A preheating system for preheating fluid medium to be fed into the HRSG is disclosed. The system includes a feed line and a recirculation line. The feed line is adapted to feed the fluid medium to a Low Pressure Economizer (LPE) of the HRSG. The feed line is adapted to be adjoined to an inlet of the LPE, and an outlet of the LPE enables therefrom the flow of the fluid medium in further portion of the HRSG. The recirculation line is adapted to be connected between the outlet and the inlet of the LPE, in parallel to LPE to recirculate the fluid medium to the LPE. A particular method of preheating using such a system is equally disclosed.

17 Claims, 4 Drawing Sheets

(51) Int. Cl.
 *F22D 1/00* (2006.01)
 *F22D 1/12* (2006.01)

(56) References Cited

U.S. PATENT DOCUMENTS

| | | | | |
|---|---|---|---|---|
| 4,081,956 A * | 4/1978 | Baker | ............... | F01K 9/04 |
| | | | | 290/40 R |
| 4,290,390 A * | 9/1981 | Juzi | ............... | F01K 3/22 |
| | | | | 122/122 |
| 4,799,461 A * | 1/1989 | Shigenaka | ............... | F01K 23/108 |
| | | | | 122/1 C |
| 6,041,588 A * | 3/2000 | Bruckner | ............... | F01K 23/106 |
| | | | | 60/39.182 |
| 6,230,480 B1 * | 5/2001 | Rollins, III | ............... | F01K 23/105 |
| | | | | 122/7 B |
| 6,401,667 B2 * | 6/2002 | Liebig | ............... | F22D 1/12 |
| | | | | 122/1 B |
| 6,427,636 B1 | 8/2002 | Liebig | | |
| 6,460,490 B1 | 10/2002 | Knauss | | |
| 7,107,774 B2 * | 9/2006 | Radovich | ............... | F01K 13/02 |
| | | | | 122/7 B |
| 2011/0225972 A1 | 9/2011 | Brueckner et al. | | |

FOREIGN PATENT DOCUMENTS

| | | |
|---|---|---|
| EP | 0281151 A2 | 9/1988 |
| EP | 0560220 A1 | 9/1993 |
| EP | 0561220 A1 | 9/1993 |
| EP | 931978 A1 | 7/1999 |
| EP | 1059488 A3 | 1/2003 |
| GB | 2099558 A | 12/1982 |
| WO | 2010054934 A2 | 5/2010 |
| WO | 2015165668 A1 | 11/2015 |
| WO | 2016096847 A1 | 6/2016 |

OTHER PUBLICATIONS

European Search Report and Opinion issued in connection with corresponding EP Application No. 14199167.9 dated Jun. 29, 2015.
International Search Report and Written Opinion issued in connection with corresponding PCT Application No. PCT/EP2015/056715 dated Jun. 30, 2015.
International Search Report and Written Opinion issued in connection with corresponding PCT Application No. PCT/EP2015/079779 dated Apr. 5, 2016.

* cited by examiner

SYSTEM AND METHOD FOR FLUID MEDIUM PREHEATING

TECHNICAL FIELD

The present disclosure relates to Combined Cycle Power Plants (CCPP), and, more particularly, to preheating systems for preheating a fluid medium to be fed into a Heat Recovery Steam Generator (HRSG) in the CCPP.

BACKGROUND

Combined Cycle Power Plants (CCPP) generally require preheating of a fluid medium to deliver Heat Recovery Steam Generators (HRSG) to up to or above a fixed minimum temperature required at the HRSG. Preheating of the fluid medium reduces the irreversibilities involved in steam generation in the HRSG and improves the thermodynamic efficiency of the CCPP. Among various others advantages of the preheating fluid medium, such preheating also helps avoid corrosion caused by flue gas condensation on outer tubes surface in inside the HRSG. Such preheating of the fluid medium may be achieved with or without feedwater heating system.

For the CCPP equipped without the feedwater heating systems, the preheating is normally achieved by recirculation of fluid medium recirculation from an economizer extraction in a dedicated HRSG coil at a cold end of the HRSG. A philosophy of the mentioned state of the art concepts is to control a fixed temperature, generally, of the fluid medium entering a low pressure economizer in HRSG in the feedwater tank.

Various configurations could realize this fluid medium heating concept, such as the one described in U.S. Pat. No. 6,427,636B1 (US'636). The described plant configuration is based on various control elements, as shown in FIG. 3 of US'636 (reproduced herein as Prior Art FIG. 4), incorporated in the fluid medium heating arrangement, such as, a first control element incorporated between the feed line and inlet line (10); a second control element incorporated between on the bypass line (11); and a third control element arranged on the recirculation line (12). US'636 also include several other process variant with additional control elements. Such various control elements throttles the flow to adjust the recirculation mass flow and therefore adjust the heat input to the fluid medium to maintain required temperature.

However, using such various control units and such regularized recirculation may constantly affect the CCPP efficiency. Such various control unit and recirculation must be carefully optimized for maximum CCPP efficiency.

BRIEF DESCRIPTION

Embodiments of the present invention are defined in the following disclosure.

The present disclosure describes an improved fluid medium preheating system, that will be presented in the following simplified brief description to provide a basic understanding of one or more aspects of the disclosure that are intended to overcome the discussed drawbacks, but to include all advantages thereof, along with providing some additional advantages. This brief description is not an extensive overview of the disclosure. It is intended to be neither identify key or critical elements of the disclosure, nor to delineate the scope of the present disclosure. Rather, the sole purpose of this brief description is to present some concepts of the disclosure, its aspects and advantages in a simplified form as a prelude to the more detailed description that is presented hereinafter An object of the present disclosure is to describe an improved fluid medium preheating system, which may enable preheating of the fluid medium with reduced control units and to maximize efficiency of a Combined Cycle Power Plants (CCPP). Such improved preheating systems may equally be capable of preventing corrosion caused by flue gas condensation on outer tubes surface in inside the HRSG. Further, an object of the present disclosure is to describe an improved preheating system, which may be convenient to use in an effective and economical way. Various other objects and features of the present disclosure will be apparent from the following detailed description and claims.

The above noted and other objects, in one aspect, may be achieved by an improved preheating system for preheating fluid medium to be fed into a Heat Recovery Steam Generator (HRSG) is provided. The preheating system includes a feed line and a recirculation line. The feed line is adapted to feed the fluid medium to a Low Pressure Economizer (LPE) of the HRSG. The feed line is adapted to be adjoined to an inlet of the LPE, and an outlet of the LPE enables therefrom the flow of the fluid medium in the HRSG. The recirculation line is adapted to be connected between the outlet and the inlet of the LPE and being arranged parallel to LPE to recirculate the fluid medium to the LPE.

In one embodiment of the present disclosure, the fluid medium is maintained above or at a minimum set temperature, defined during the design based on the sulphur/water content in the flue gas. In such embodiment, the preheating system may include a temperature control circuit configured to the feed line and the recirculation line to send signals to actuate and de-actuate the recirculation of the fluid medium based on the temperature of the fluid medium at the inlet of the LPE in order to maintain the minimum set temperature of the fluid medium to enter in the LPE.

In a further embodiment of the present disclosure, instead of defining the minimum set temperature during the design, as in the above embodiment, the fluid medium is maintained at a temperature, a required minimum or above set temperature, as required by the HRSG during operation. As per this embodiment, a measurement element circuit, such as, a Continuous Emission Monitoring System (CEMS) circuit or any other measuring device, such as dedicated water/acid dew point measurement device, is configured to the HRSG to enable calculation of the required minimum set temperature, based on parameters of the HRSG, at which the fluid medium is required to be kept for recirculation in the HRSG.

Both embodiments of the preheating system may optionally include a bypass line equipped with a control valve element running from the feed line to the outlet of the LPE. Further in both the embodiments of the present disclosure, the preheating system may also include a control arrangement configured in the recirculation line to enable recirculation of the fluid medium via the recirculation line.

In a further aspect of the present disclosure, preheating system includes a heat shift configuration configured to increase an operational pressure of steam in the evaporator to shift heat to the LPE or to the feed line to increase heat gain in the fluid medium.

Such improved preheating systems, may enable preheating of the fluid medium with reduced control units and maximize efficiency of a Combined Cycle Power Plants (CCPP). Such improved preheating systems may equally be capable in preventing corrosion caused by flue gas condensation on outer tubes surface in inside the HRSG. Further, such improved preheating system may be convenient to use in an effective and economical way.

These together with the other aspects of the present disclosure, along with the various features of novelty that characterize the present disclosure, are pointed out with particularity in the present disclosure. For a better understanding of the present disclosure, its operating advantages, and its uses, reference should be made to the accompanying drawings and descriptive matter in which there are illustrated exemplary embodiments of the present disclosure.

BRIEF DESCRIPTION OF THE DRAWINGS

The advantages and features of the present disclosure will be better understood with reference to the following detailed description and claims taken in conjunction with the accompanying drawing, wherein like elements are identified with like symbols, and in which:

Like reference numerals refer to like parts throughout the description of several views of the drawings.

DETAILED DESCRIPTION

For a thorough understanding of the present disclosure, reference is to be made to the following detailed description, including the appended claims, in connection with the above described drawings. In the following description, for purposes of explanation, numerous specific details are set forth in order to provide a thorough understanding of the present disclosure. It will be apparent, however, to one skilled in the art that the present disclosure can be practiced without these specific details. In other instances, structures and apparatuses are shown in block diagrams form only, in order to avoid obscuring the disclosure. Reference in this specification to "one embodiment," "an embodiment," "another embodiment," "various embodiments," means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but may not be of other embodiment's requirement.

Although the following description contains many specifics for the purposes of illustration, anyone skilled in the art will appreciate that many variations and/or alterations to these details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure. The terms "a" and "an" herein do not denote a limitation of quantity, but rather denote the presence of at least one of the referenced item.

Figure 1:
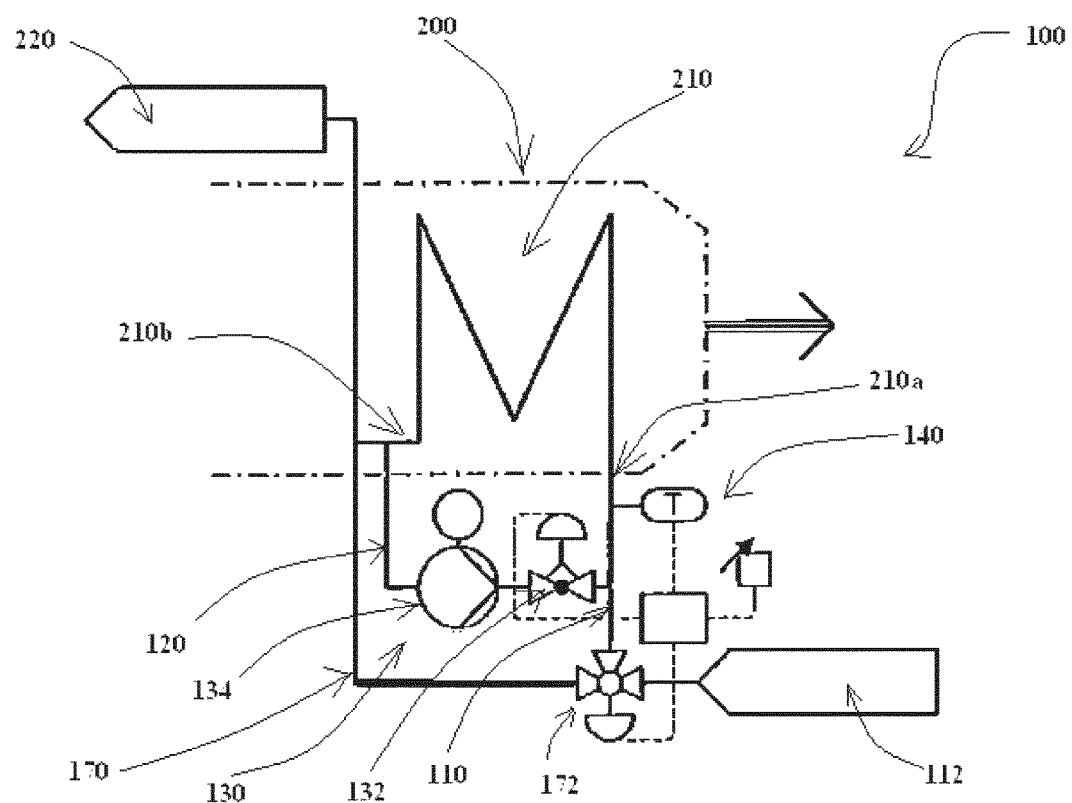
FIG. 1 illustrates an example line diagram of a preheating system, in accordance with a first exemplary embodiment of the present disclosure.
Figure 2:
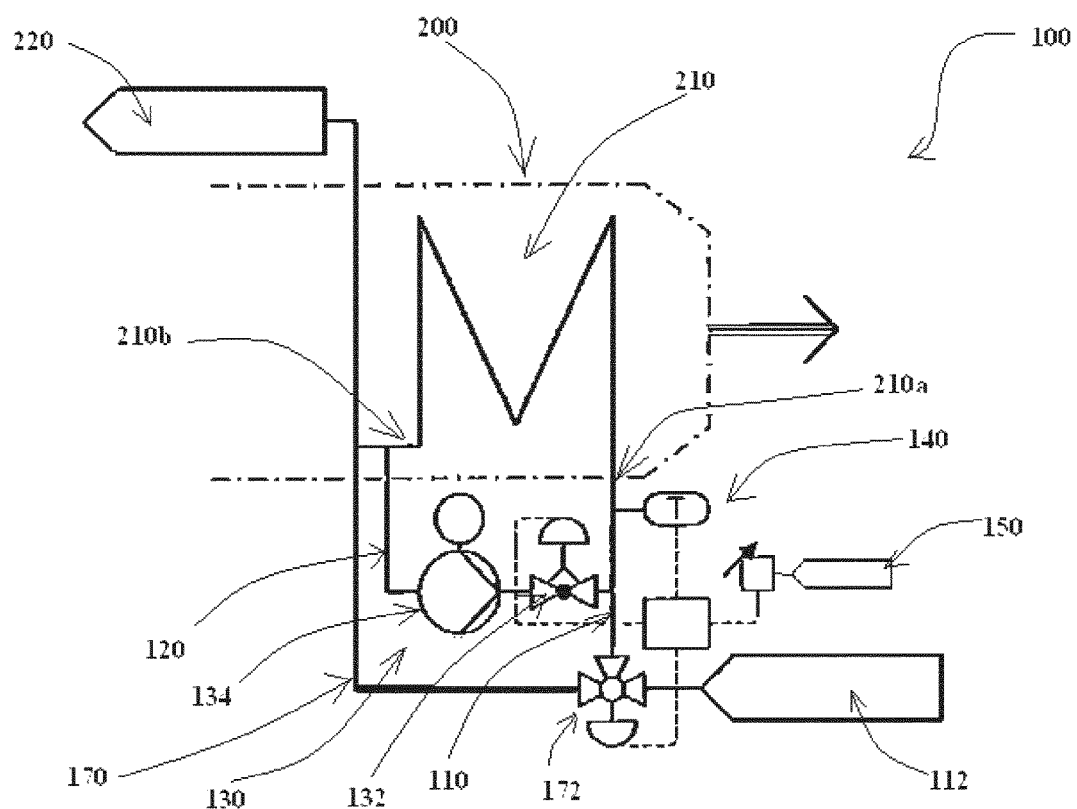
FIG. 2 illustrates an example line diagram of a preheating system, in accordance with a second exemplary embodiment of the present disclosure.
Figure 3:
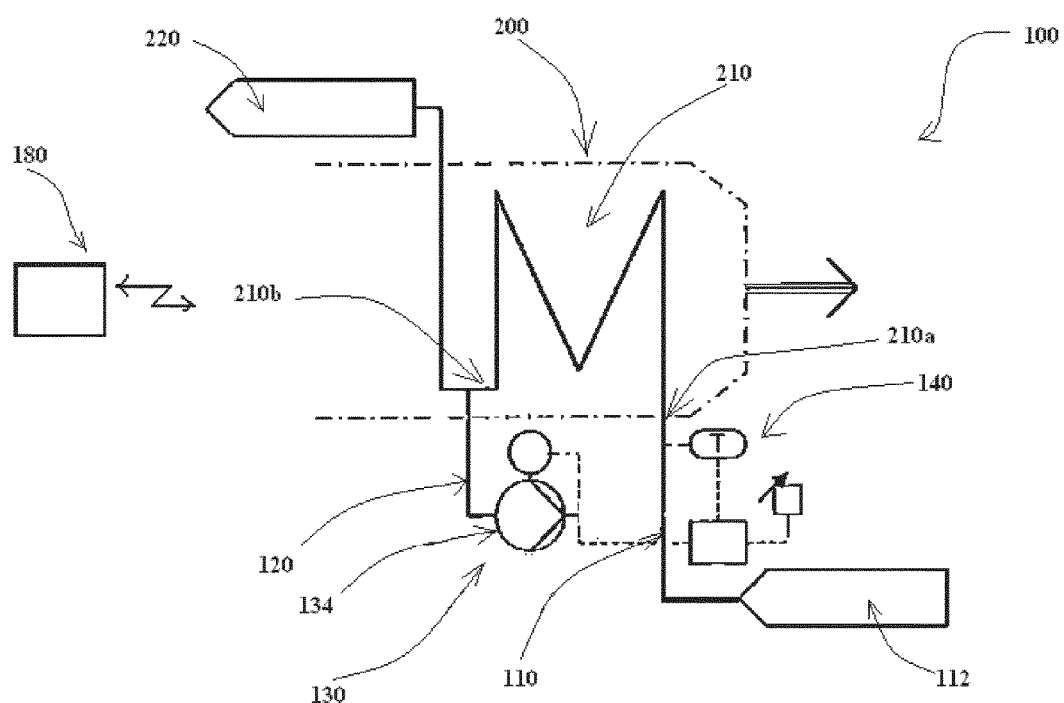
FIG. 3 illustrates an example line diagram of a preheating system, in accordance with a third exemplary embodiment of the present disclosure.

Referring now to FIGS. 1 to 3, various examples of preheating systems 100 are illustrated in accordance with various exemplary embodiments of the present disclosure. In as much as the construction and arrangement of the preheating system 100 and its arrangement with respect a Heat Recovery Steam Generator (HRSG) 200 to maximize efficiency of a Combined Cycle Power Plants (CCPP), various associated elements may be well-known to those skilled in the art, it is not deemed necessary for purposes of acquiring an understanding of the present disclosure that there be recited herein all of the constructional details and explanation thereof. Rather, it is deemed sufficient to simply note that as shown in FIGS. 1 to 3, the preheating systems 100, only those components are shown that are relevant for the description of various embodiments of the present disclosure.

As shown in FIG. 1, according to first aspect the present disclosure, the preheating system 100 for preheating fluid medium to be fed into the HRSG 200 includes a feed line 110 and a recirculation line 120. The feed line 110 is adapted to feed the fluid medium to a Low Pressure Economizer (LPE) 210 of the HRSG 200 from a main condensate source 112. The feed line 110 is adapted to be adjoined to an inlet 210a of the LPE 210. Further, an outlet 210b of the LPE 210 enables therefrom the flow of the fluid medium in further portion of the HRSG 200. The recirculation line 120 is adapted to be connected between the outlet 210a and the inlet 210b of the LPE 210, in parallel to LPE 210 to recirculate the fluid medium to the LPE 210.

Figure 4:
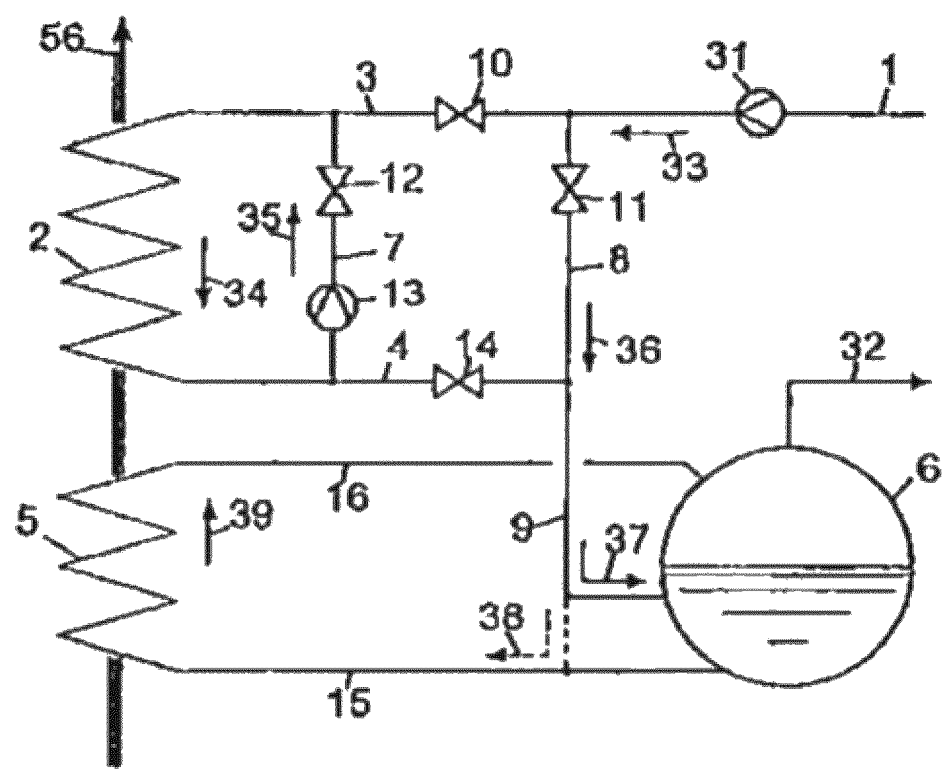
FIG. 4 illustrates prior art knowledge as known in U.S. Pat. No. 6,427,636B1.

Further, the preheating system 100 may include a control arrangement 130 to enable recirculation of the fluid medium. As shown in FIG. 1, the control arrangement 130 is configured in the recirculation line 120 to enable recirculation of the fluid medium via the recirculation line 120. In one embodiment, the control arrangement 130 may be at least one of a control valve 132 or a pump 134 or both, configured in the recirculation line 120. For example, as shown in FIG. 1, the control valve 132 and the pump 134 (specifically a constant volume pump) both are configured, whereas in FIG. 3, only pump 134 (specifically a variable speed pump) is configured. As compared to the prior art preheating system, shown in FIG. 4, the plant configuration is based on various control elements, such as, elements 10, 11 and 12; however, the preheating system 100 of the present embodiment precludes various such control elements and simplify the system with one control arrangement 130 to reduce component loss while fluid medium preheating and increasing efficiency of the preheating system 100. The control arrangement 130 is fully redundant to recirculate the fluid medium to reduce heat loss while recirculation, as against the prior art preheating system that recirculate fluid medium utilizing various control elements and complex recirculation circuits that affects the efficiency thereof.

In one embodiment of the present disclosure as shown in FIG. 1, the preheating of the fluid medium is maintained at minimum or above a set temperature, defined during the design based on the sulphur/water content in the flue gas of the CCPP. In this embodiment, preclusion of various control elements from the recirculation circuit 120 and providing only one control arrangement 130, makes the preheating system 100 fully redundant to recirculate the fluid medium such that that reduces heat loss while fluid medium recirculation and maintain the minimum set temperature of the fluid medium, as set during designing. For properly maintaining the minimum or above a set temperature, the preheating system 100 includes a temperature control circuit 140 configured to the feed line 110 and the recirculation line 120. The temperature control circuit 140 is configured to send signals to actuate and de-actuate the recirculation line 120 via the control arrangement 130 based on the temperature of the fluid medium at the inlet 210*a* of the LPE 210. Based on the actuation and de-actuation, the control arrangement 130 regulates the fluid medium in the LPE 210 in order to maintain the minimum set temperature therein.

As shown in FIG. 1, the preheating system 100 may also include a bypass line 170 equipped with a control valve element 172 running from the feed line 110 to the outlet 210*b* of the LPE 210. The control valve element 172 may be one of a three-way or a two-way shutoff valve. The preheating system 100 without the bypass line 170 is illustrated in FIG. 3. The bypass line 170 is equipped to bypass the fluid medium from the feed line 110 directly to an evaporator 220 of the HRSG 200 in case when the temperature of the fluid medium may not reach the minimum required temperature.

Referring now to FIG. 2, a second aspect of the present disclosure, where instead of defining the minimum set temperature during the design, as in the first aspect described with respect to FIG. 1, the fluid medium is maintained at or above a required temperature, herein after referred as "required minimum temperature," as required by the HRSG 200 during the operation. As per this aspect, shown in FIG. 2, a measurement device 150 circuit is configured to the temperature control circuit 140 and to the HRSG 200. In one embodiment, the measurement device 150 may be Continuous Emission Monitoring System (CEMS), which may be configured to the temperature control circuit 140 and the HRSG 200 to calculate the required minimum temperature for the fluid medium, based on parameters of the HRSG 200, at which the fluid medium is required to be kept for recirculation in the HRSG 200 to avoid corrosion thereof. However, without departing from the scope of the present disclosure, apart from the CEMS, any other measuring device, such as dedicated water/acid dew point measurement device may also be used to for calculation of the required minimum temperature. Further, in this second aspect (as shown in FIG. 2), similar to the first aspect (as per FIG. 1), preclusion of various control elements from the recirculation circuit and providing only one control arrangement 130, makes the preheating system 100 fully redundant to recirculate the fluid medium such that that reduces heat loss while fluid medium recirculation and maintain the required minimum temperature of the fluid medium, as calculated by the temperature control circuit 140. Furthermore, similar to the first aspect, the bypass line 170 may be optionally equipped with the control valve element 172 running from the feed line 110 to the outlet 210*b* of the LPE 210.

Referring now to FIG. 3, third aspect of the fluid medium preheating system 100 is depicted. As per this aspect, the preheating system 100 includes heat shift configuration 180 configured to increase an operational pressure of steam in the evaporator 220 to shift heat to the LPE 210 or to the feed line 110 to increase heat gain in the fluid medium. In an exemplary embodiment, a steam turbine control valve that is equipped in a typical arrangement of the steam turbine may be used for the said purpose. The steam turbine control valve may throttle the steam flow that results in the higher pressure in the LPE 210 and therefore the heat is shifted to the LPE 210. Since the heat required for preheating the fluid medium is gained by shifting the heat, a need of LPE 210 bypass line 170 may be eliminated, which may be required in above embodiments as depicted in FIGS. 1 and 2, thereby increasing the efficiency of the HRSG 200. Such arrangement may be a case when the gas turbine is fuel oil.

The preheating system 100 as shown in FIG. 3 may also include, similar to above embodiments, the temperature control circuit 140 configured to the heat shift configuration 180, particularly to the steam turbine control valve, to send signals to throttle the steam turbine control valve to increase or decrease the operational pressure based on the temperature of the fluid medium.

The present disclosure may have a number of potential benefits. Such improved preheating systems may enable preheating of the fluid medium with reduced control units and to maximize efficiency of a Combined Cycle Power Plants (CCPP). Such improved preheating systems may equally be capable in preventing corrosion caused by flue gas condensation on outer tubes surface in inside the HRSG. Further, the improved preheating systems may be convenient to use in an effective and economical way. Various other advantages and features of the present disclosure are apparent from the above detailed description and appendage claims.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omission and substitutions of equivalents are contemplated as circumstance may suggest or render expedient, but such are intended to cover the application or implementation without departing from the spirit or scope of the claims of the present disclosure.

What is claimed is:

1. A preheating system for preheating a fluid medium, comprising:
   a Low Pressure Economizer (LPE) in a Heat Recovery Steam Generator (HRSG), the LPE comprising an inlet and an outlet;
   a feed line to feed the fluid medium to the LPE, wherein the feed line is joined to the inlet of the LPE;
   a recirculation line connected between the outlet and the inlet of the LPE and arranged to recirculate the fluid medium from the outlet of the LPE to the inlet of the LPE;
   a heat shift configuration to increase an operational pressure of steam in an evaporator of the HRSG to shift heat to the LPE or to the feed line to increase heat gain in the fluid medium;
   a temperature control circuit operably connected to the feed line and the recirculation line, and configured to send signals to actuate and de-actuate the recirculation of the fluid medium based on the required minimum temperature of the fluid medium at the inlet of the LPE—in order to maintain the required minimum temperature as required by the HRSG; and
   a measurement element circuit operably connected to the temperature control circuit and to the HRSG, the measurement element configured:

to enable calculation of the required minimum temperature at which the fluid medium is required to be kept for recirculation in the HRSG, based on parameters of the HRSG; and to enable the temperature control circuit to send signals to actuate and de-actuate the recirculation of the fluid medium based on the calculated required minimum temperature to recirculate the fluid medium from the recirculation line.

2. The preheating system as claimed in claim 1, further comprising a control arrangement arranged in the recirculation line and configured to enable recirculation of the fluid medium via the recirculation line.

3. The preheating system as claimed in claim 2, wherein the control arrangement comprises at least one of a control valve or a variable speed pump.

4. The preheating system as claimed in claim 1, wherein the fluid medium is maintained at or above a minimum set temperature.

5. The preheating system as claimed in claim 4, further comprising a temperature control circuit operably connected to the feed line and the recirculation line, and configured to send signals to actuate and de-actuate the recirculation of the fluid medium based on the temperature of the fluid medium at the inlet of the LPE in order to maintain the minimum set temperature of the fluid medium to enter in the LPE.

6. The preheating system as claimed in claim 1, wherein the fluid medium is maintained at a required minimum temperature, as required by the HRSG.

7. The preheating system as claimed in claim 1, wherein the measurement element is a Continuous Emission Monitoring System (CEMS).

8. The preheating system as claimed in claim 1, further comprising a bypass line equipped with a control valve element running from the feed line to the outlet of the LPE.

9. The preheating system as claimed in claim 8, wherein the control valve element is one of a three-way or a two-way shutoff valve.

10. The preheating system as claimed in claim 1, further comprising a temperature control circuit configured to send signals to increase or decrease the operational pressure based on the temperature of the fluid medium.

11. A method of operating a preheating system for preheating a fluid medium, the preheating system comprising a Low Pressure Economizer (LPE) in a Heat Recovery Steam Generator (HRSG), the LPE comprising an inlet and an outlet, the method comprising the steps of:

feeding the fluid medium through a feed line to the inlet of the LPE and through the LPE—to the outlet of the LPE;

recirculating the fluid medium from the outlet to the inlet of the LPE;

increasing, using a heat shift configuration, an operational pressure of steam in an evaporator of the HRSG to shift heat to the LPE or to the feed line to increase heat gain in the fluid medium;

maintaining the required minimum temperature as required by the HRSG with a temperature control circuit of the preheating system, the temperature control circuit operably connected to the feed line and the return line, to send signals to actuate and de-actuate the recirculation of the fluid medium based on a required minimum temperature of the fluid medium at the inlet of the LPE;

using a measurement element circuit operably connected to the temperature control circuit and to the HRSG to calculate the required minimum temperature at which the fluid medium is required to be kept for recirculation in the HRSG, based on parameters of the HRSG; and using the temperature control circuit to send signals to actuate and de-actuate the recirculation of the fluid medium based on the calculated required minimum temperature to recirculate the fluid medium from the recirculation line.

12. The method of claim 11, further comprising the step of sending signals to increase or decrease the operational pressure based on the temperature of the fluid medium.

13. The preheating system as claimed in claim 1, further comprising a control arrangement arranged in the recirculation line and configured to enable recirculation of the fluid medium via the recirculation line, wherein the control arrangement comprises at least one of a control valve or a variable speed pump.

14. The preheating system as claimed in claim 13, further comprising a bypass line equipped with a control valve element running from the feed line to the outlet of the LPE.

15. The method of claim 11, wherein the operational pressure is increased by throttling the steam flow through a steam turbine control valve.

16. The method of claim 11, wherein the operational pressure is increased by throttling the steam flow through a steam turbine control valve.

17. The method of claim 11, further comprising the step of sending signals to increase or decrease the operational pressure based on the temperature of the fluid medium.

* * * * *